United States Patent
Morita

(10) Patent No.: US 12,545,131 B2
(45) Date of Patent: Feb. 10, 2026

(54) VEHICLE BATTERY CHARGING APPARATUS USING PLURALITY OF SUPPLY AND INLETS

(71) Applicant: SUBARU CORPORATION, Tokyo (JP)

(72) Inventor: Tomohiro Morita, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 363 days.

(21) Appl. No.: 18/125,314

(22) Filed: Mar. 23, 2023

(65) Prior Publication Data

US 2023/0311681 A1  Oct. 5, 2023

(30) Foreign Application Priority Data

Apr. 1, 2022  (JP) ................. 2022-061851

(51) Int. Cl.
*B60L 53/16* (2019.01)
*B60L 53/62* (2019.01)

(52) U.S. Cl.
CPC ............. *B60L 53/16* (2019.02); *B60L 53/62* (2019.02); *B60L 2240/549* (2013.01)

(58) Field of Classification Search
CPC ..... B60L 53/16; B60L 53/62; B60L 2240/549
USPC ........................................ 700/297
See application file for complete search history.

(56) References Cited

U.S. PATENT DOCUMENTS

| | | | |
|---|---|---|---|
| 2018/0072169 A1* | 3/2018 | Lee | B60L 53/305 |
| 2018/0215278 A1* | 8/2018 | Yabuuchi | H01M 10/48 |
| 2019/0225096 A1 | 7/2019 | Hiroe | |
| 2019/0232813 A1* | 8/2019 | Kusumi | B60L 53/305 |
| 2019/0344677 A1* | 11/2019 | Ishida | B60L 53/18 |
| 2020/0108729 A1* | 4/2020 | Tsukamoto | B60L 53/62 |
| 2020/0353934 A1 | 11/2020 | Vulcu | |
| 2023/0070814 A1* | 3/2023 | Kim | B60L 53/16 |
| 2025/0183677 A1* | 6/2025 | Malik | B60L 53/14 |

FOREIGN PATENT DOCUMENTS

| | | |
|---|---|---|
| JP | 2009-278706 A | 11/2009 |
| JP | 2012-085467 A | 4/2012 |
| JP | 2012-147617 A | 8/2012 |
| JP | 2013-042639 A | 2/2013 |
| JP | 2013-062978 A | 4/2013 |
| JP | 2014-117070 A | 6/2014 |
| JP | 2014-155420 A | 8/2014 |
| JP | 2016-052160 A | 4/2016 |
| JP | 2017-175790 A | 9/2017 |
| JP | 2017-221019 A | 12/2017 |
| JP | 2019-129557 A | 8/2019 |
| JP | 2020-156202 A | 9/2020 |
| JP | 2020-185378 A | 11/2020 |

OTHER PUBLICATIONS

Office Action dated Nov. 25, 2025, issued in Japanese Patent Application No. 2022-061851 (including English translation).

* cited by examiner

*Primary Examiner* — Md Azad
(74) *Attorney, Agent, or Firm* — TROUTMAN PEPPER LOCKE LLP

(57) ABSTRACT

A vehicle includes inlets, one contactor, and a controller. Charging guns of charging apparatuses are to be inserted into the inlets respectively. The contactor is coupled between the inlets and a battery. The controller is configured to perform control to allow the charging apparatuses to simultaneously charge the battery.

6 Claims, 6 Drawing Sheets

VEHICLE BATTERY CHARGING APPARATUS USING PLURALITY OF SUPPLY AND INLETS

CROSS-REFERENCE TO RELATED APPLICATION

The present application claims priority from Japanese Patent Application No. 2022-061851 filed on Apr. 1, 2022, the entire contents of which are hereby incorporated by reference.

BACKGROUND

The disclosure relates to the technical field of vehicles including a battery.

Conventionally, among vehicles such as an electric vehicle or a plug-in hybrid vehicle including a driving motor, there is a vehicle provided with an inlet into which a charging gun (charging connector) of an external charging apparatus is inserted.

Among such vehicles, there has been proposed a vehicle in which two inlets are provided and one contactor is used in common for these inlets (see, for example, Japanese Unexamined Patent Application Publication (JP-A) No. 2020-185378). In this vehicle, one of the two inlets is brought into a state coupleable to the charging apparatus, and the other is brought into a state uncoupleable to the charging apparatus, so that a battery can be charged from the one charging apparatus.

SUMMARY

An aspect of the disclosure provides a vehicle. The vehicle includes inlets, one contactor, and a controller. Charging guns of charging apparatuses are to be inserted into the inlets respectively. The contactor is coupled between the inlets and a battery. The controller is configured to perform control to allow the charging apparatuses to simultaneously charge the battery.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

In recent years, the capacity of a battery mounted on a vehicle has increased, and the charging time of the battery has also tended to increase. Therefore, it is desired to efficiently charge the battery.

It is desirable to efficiently charge a battery while improving user convenience.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
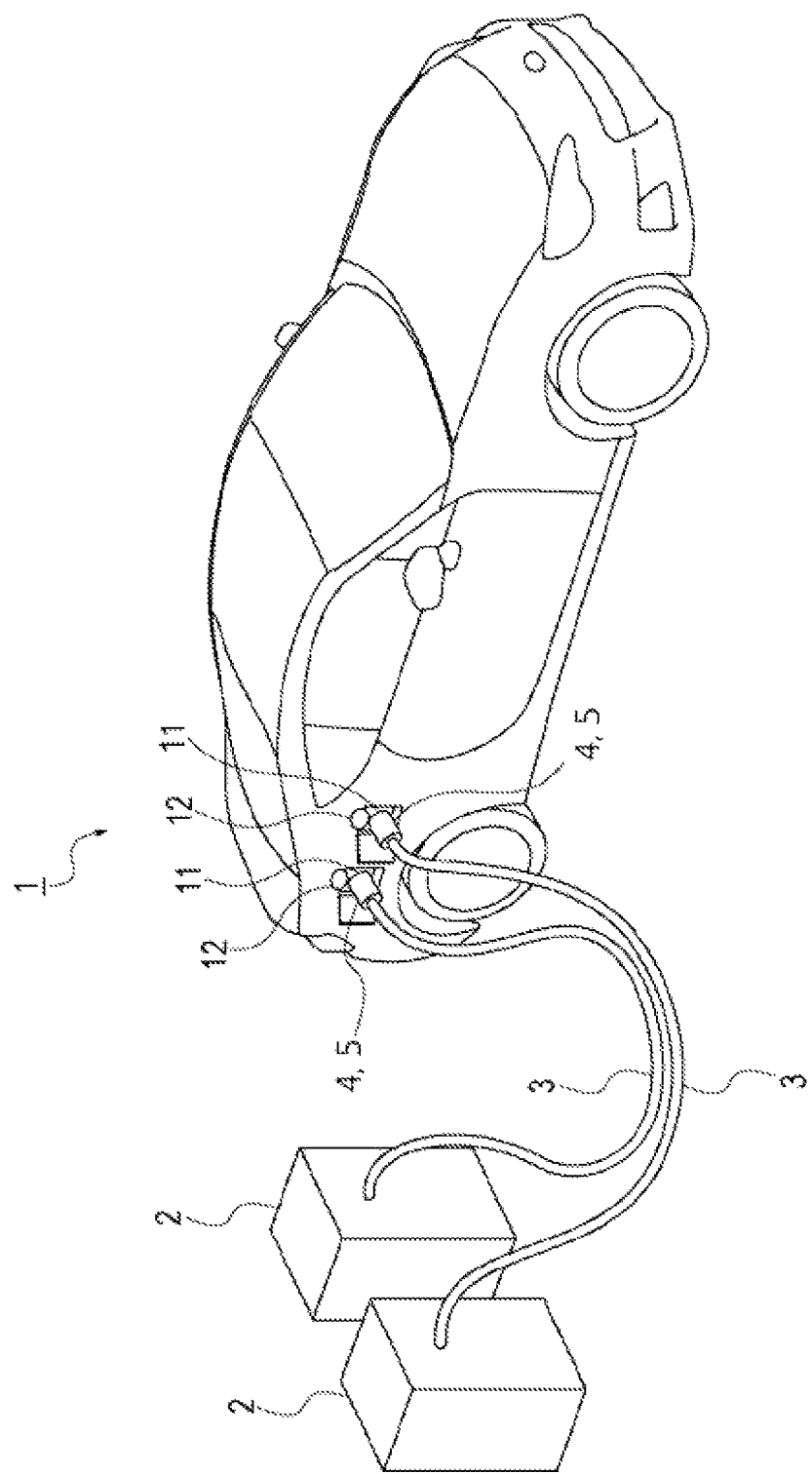
FIG. 1 is a diagram illustrating an outline of a configuration of a vehicle.

FIG. 1 is a diagram illustrating an outline of a configuration of a vehicle 1. The vehicle 1 is an electric vehicle, a plug-in hybrid vehicle, or the like that has a battery 14 (see FIG. 2) chargeable from a charger 2 that is an external charging apparatus. The vehicle 1 travels by supplying electricity stored in the battery 14 to a driving motor as a power source and causing the driving motor to drive.

In the vehicle 1, the battery 14 is charged with a direct current supplied from the charger 2. The charger 2 is provided with a transmission cable 3, and a charging gun 4 is attached to a distal end of the transmission cable 3. The charger 2 supplies, via the transmission cable 3, a direct current to the vehicle 1 with the charging gun 4 being inserted.

The vehicle 1 is provided with two inlets 11 and two lids 12 for opening and closing the inlets 11.

Although described in detail later, the inlet 11 is provided with a lid lock mechanism 18 (see FIG. 2), and a user can open the lid 12 by unlocking the lid lock mechanism 18. When the user opens the lid 12, the inlet 11 is opened.

In the vehicle 1, one charging gun 4 is inserted into one of the inlets 11, and the battery 14 can be charged by receiving supply of a direct current from one charger 2. In the vehicle 1, the two charging guns 4 can be inserted into both the inlets 11, and the battery 14 can be charged by simultaneously receiving the supply of the direct current from the two chargers 2.

Here, a case where one transmission cable 3 and one charging gun 4 are provided in one charger 2 will be described, but multiple transmission cables 3 and multiple charging guns 4 may be provided in one charger 2.

In the following description, when the two inlets 11 are distinguished and described, they may be referred to as a first inlet 11a and a second inlet 11b. The lid 12 that opens and closes the first inlet 11a may be referred to as a first lid 12a, and the lid 12 that opens and closes the second inlet 11b may be referred to as a second lid 12b.

Figure 2:
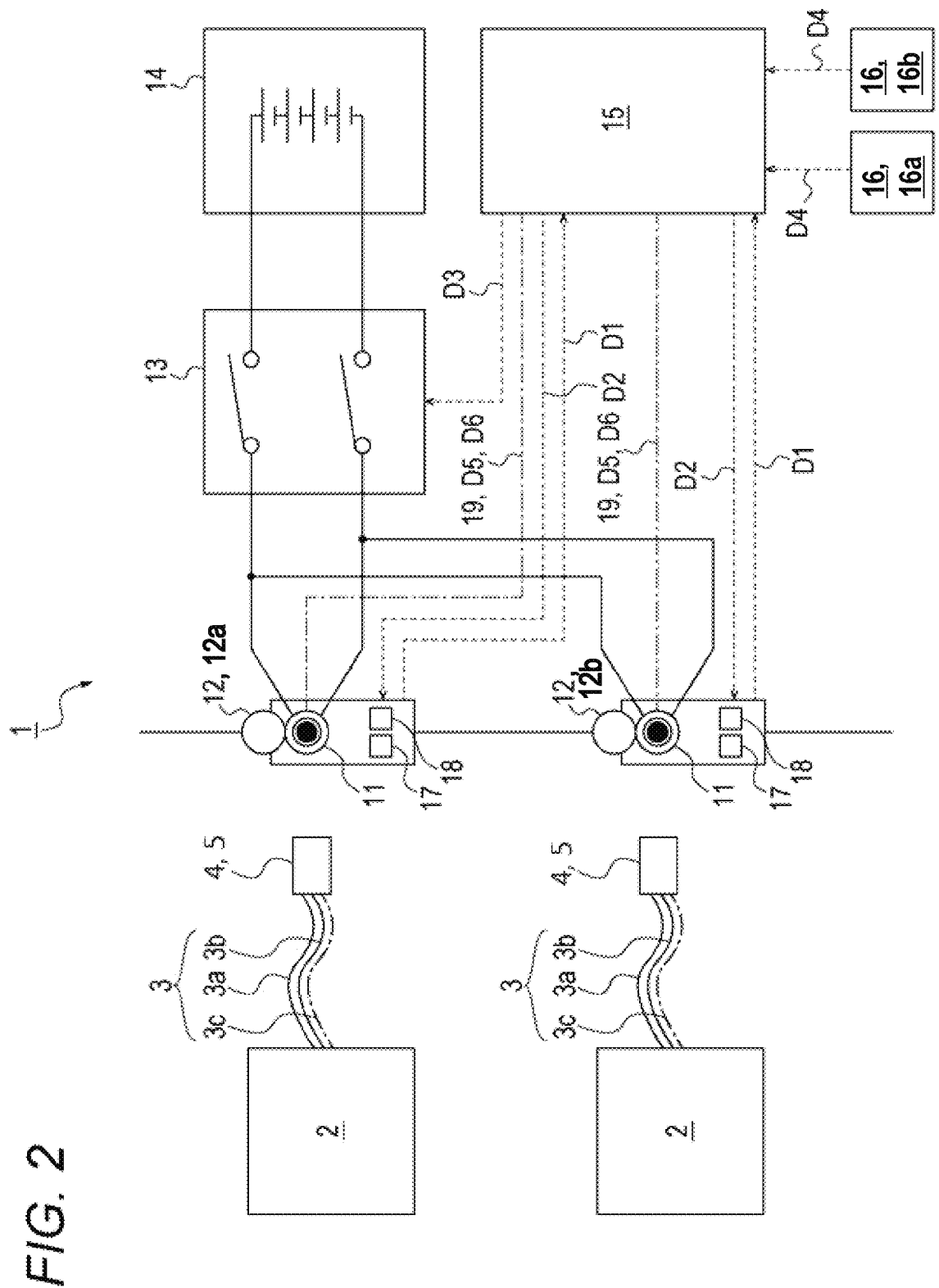
FIG. 2 is a diagram illustrating a configuration of a vehicle and a charger.

FIG. 2 is a diagram illustrating configurations of the vehicle 1 and the charger 2. Note that, in FIG. 2, electrical wiring is indicated by a solid line, a signal flow is indicated by a broken line, and a signal line of data communication is indicated by an alternate long and short dash line.

As illustrated in FIG. 2, the transmission cable 3 of the charger 2 includes two electric wires 3a and 3b for supplying a direct current, and a signal line 3c for performing data communication in accordance with a predetermined in-vehicle network communication standard such as a controller area network (CAN).

The charging gun 4 is provided with a charging gun lock mechanism 5. The charging gun lock mechanism 5 includes, for example, a hook that can project when the charging gun 4 is inserted into the inlet 11, and a solenoid that can restrict movement of the hook in a state where the hook projects.

When the charging gun 4 is inserted into the inlet 11, the hook projects and engages with the inlet 11. In a state where the hook is engaged with the inlet 11, the solenoid is energized and driven, and the movement of the hook is restricted. Accordingly, the charging gun lock mechanism 5 can lock the charging gun 4 to the inlet 11.

When the energization of the solenoid is stopped, the hook can be retracted. Accordingly, the charging gun lock mechanism 5 can unlock the charging gun 4 from the inlet 11.

The vehicle 1 includes the two inlets 11, the two lids 12, one contactor 13, the battery 14, a battery control unit (BCU) 15, and two inlet opening switches 16.

The inlet 11 is provided with a state detection sensor 17 for detecting insertion of the charging gun 4, opening of the inlet 11, and closing of the lid 12. Upon detecting insertion of the charging gun 4, opening of the inlet 11, and closing of the lid 12, the state detection sensor 17 outputs a detection result to the BCU 15 as an inlet state detection signal D1.

The inlet 11 is provided with the lid lock mechanism 18 that locks the lid 12 with respect to the housing of the vehicle 1 to prevent the inlet 11 from being opened.

The lid lock mechanism 18 is locked and unlocked based on the control of the BCU 15.

The contactor 13 is coupled between the two inlets 11 and the battery 14. For example, in the contactor 13, the two inlets 11 are coupled in parallel with one end side, and the battery 14 is coupled with the other end side.

The contactor 13 is turned on and off based on the control of the BCU 15. When the contactor 13 is turned off, the two inlets 11 and the battery 14 are cut off, and when the contactor 13 is turned on, the two inlets 11 and the battery 14 are coupled.

The battery 14 is what is called a high-voltage battery, and can store electricity (electric power) to be supplied to the driving motor.

The BCU 15 is a processor including a central processing unit (CPU), a read only memory (ROM), and a random access memory (RAM). The BCU 15 controls each unit related to the battery 14 by developing a program stored in the ROM on the RAM and executing the program.

The BCU 15 is coupled to the two inlets 11, the one contactor 13, and the two inlet opening switches 16. Then, the BCU 15 receives the inlet state detection signal D1 output from the state detection sensor 17. The BCU 15 transmits a lid lock signal D2 for instructing to lock or unlock the lid 12 to the lid lock mechanism 18 (inlet 11). Furthermore, the BCU 15 transmits, to the contactor 13, a contactor drive signal D3 for switching on/off of the contactor 13. The BCU 15 receives, from the inlet opening switch 16, an inlet opening request signal D4 indicating that the inlet opening switch 16 has been operated.

The BCU 15 and the inlet 11 are coupled by a signal line 19 capable of data communication corresponding to the predetermined in-vehicle network communication standard such as CAN. In a state where the charging gun 4 is inserted into the inlet 11, the signal line 3c and the signal line 19 are coupled. Thus, the BCU 15 can perform data communication with the charger 2 via the signal line 3c and the signal line 19.

In the data communication, for example, a charging gun lock signal D5 for instructing to lock or unlock the charging gun 4 in a state where the charging gun 4 is inserted into the inlet 11 is transmitted from the BCU 15 to the charger 2. A command value signal D6 for instructing a current value and a voltage value at the time of charging is transmitted from the BCU 15 to the charger 2.

The inlet opening switch 16 is provided, for example, in the vehicle, in the vicinity of the inlet 11, or the like, and receives an operation input for requesting opening of the inlet 11. Here, the opening of the inlet 11 includes opening the lid 12 to open the inlet 11 in a state where the lid 12 closes the inlet 11, and opening the inlet 11 by removing the charging gun 4 in a state where the charging gun 4 is inserted into the inlet 11.

Note that the inlet opening switch 16 that receives an operation input for opening the first inlet 11a may be referred to as a first inlet opening switch 16a, and the inlet opening switch 16 that receives an operation input for opening the second inlet 11b may be referred to as a second inlet opening switch 16b.

Figure 3:
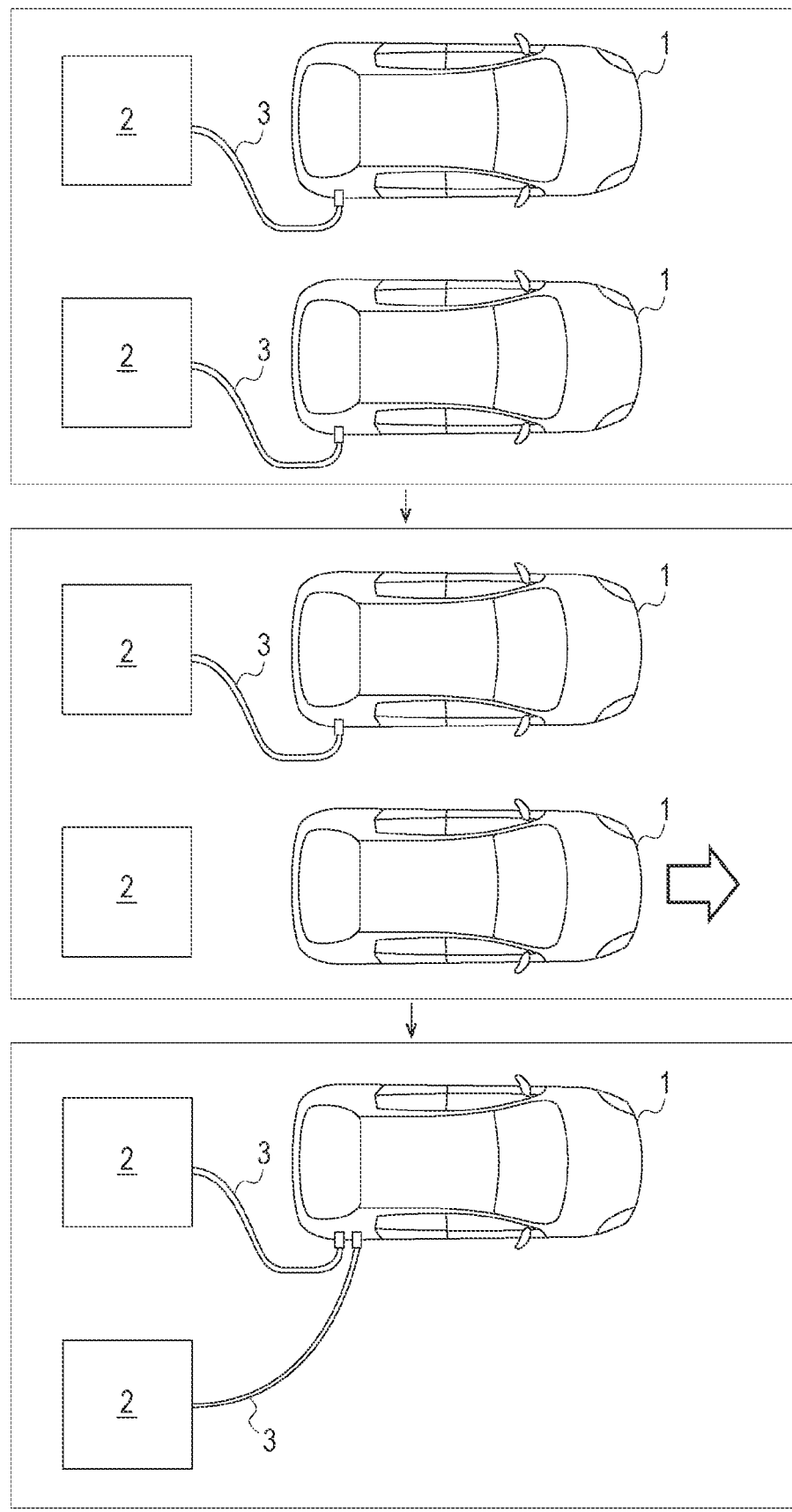
FIG. 3 is a diagram illustrating how charging by one charger is changed to charging by two chargers.
Figure 4:
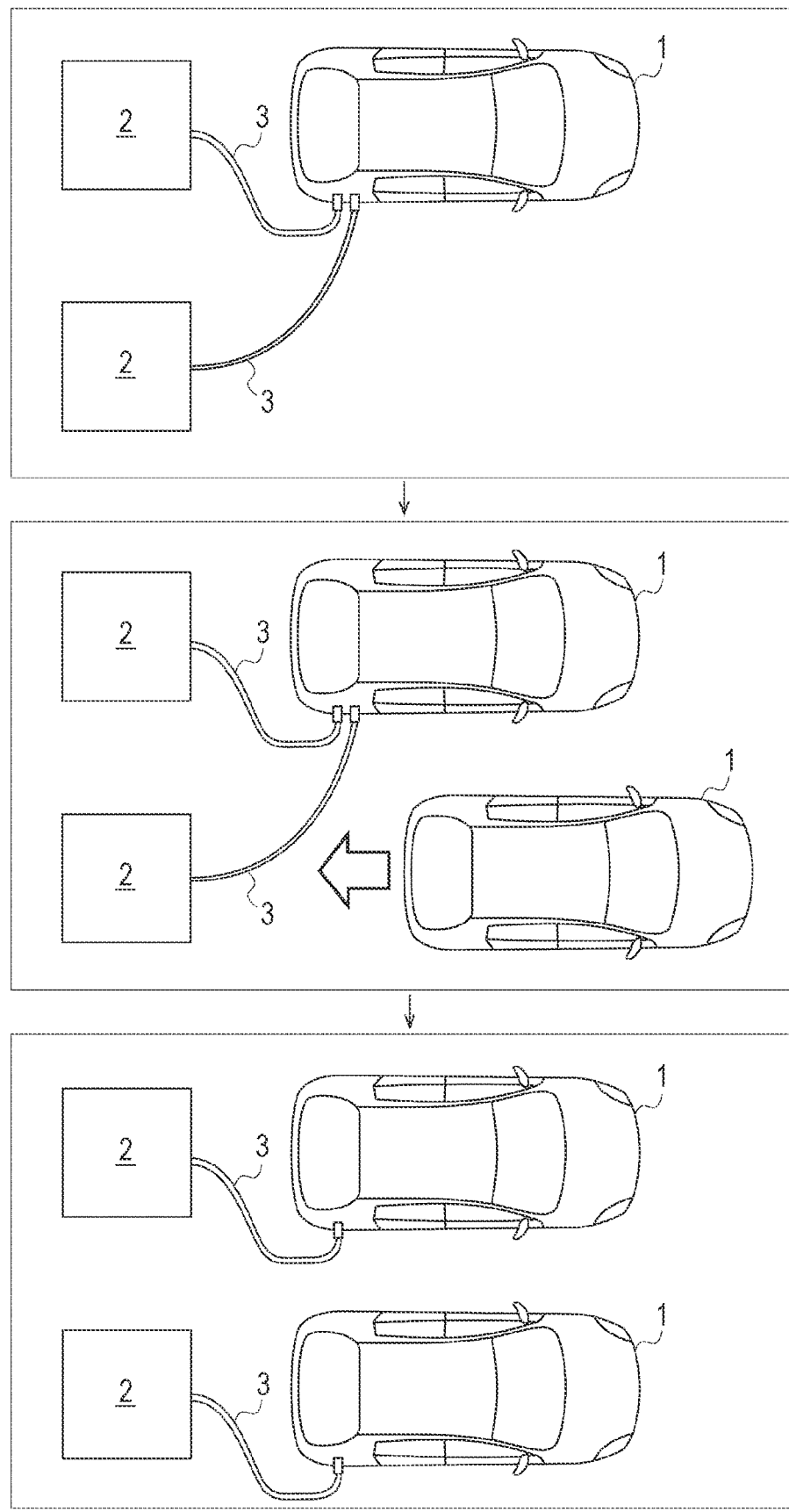
FIG. 4 is a diagram illustrating how charging by two chargers is changed to charging by one charger.

FIG. 3 is a diagram illustrating how charging by one charger 2 is changed to charging by two chargers 2. FIG. 4 is a diagram illustrating how charging by two chargers 2 is changed to charging by one charger 2.

Incidentally, since the vehicle 1 includes the two inlets 11, it is conceivable to change charging by one charger 2 to charging by two chargers 2, or change charging by two chargers 2 to charging by one charger 2.

For example, as illustrated in an upper part of FIG. 3, it is assumed that different vehicles 1 are each charged by one charger 2. Then, as illustrated in a middle part of FIG. 3, it is assumed that charging of one of the vehicles 1 is finished and one charger 2 is vacant. In such a case, as illustrated in a lower part of FIG. 3, the other vehicle 1 that is being charged continues charging using the vacant charger 2, that is, by two chargers 2.

As illustrated in an upper part of FIG. 4, it is assumed that one vehicle 1 is charged by two chargers 2. Then, as illustrated in a middle part of FIG. 4, it is assumed that a different vehicle 1 approaches the one charger 2 for charging. In such a case, as illustrated in a lower part of FIG. 4, in the vehicle 1 charged by the two chargers 2, the charging gun 4 of one charger 2 is removed and charging is switched to charging by one charger 2. Then, in the other vehicle 1, the removed charging gun 4 is inserted and charging by one charger 2 is started. As a result, the two vehicles 1 are each charged by one charger 2.

As described above, in the vehicle 1, it is assumed that charging by one charger 2 and charging by two chargers 2 are switched during charging. Hereinafter, a state transition and a control flow of a charging process when charging by one charger 2 and charging by two chargers 2 are switched during charging will be described.

Figure 5:
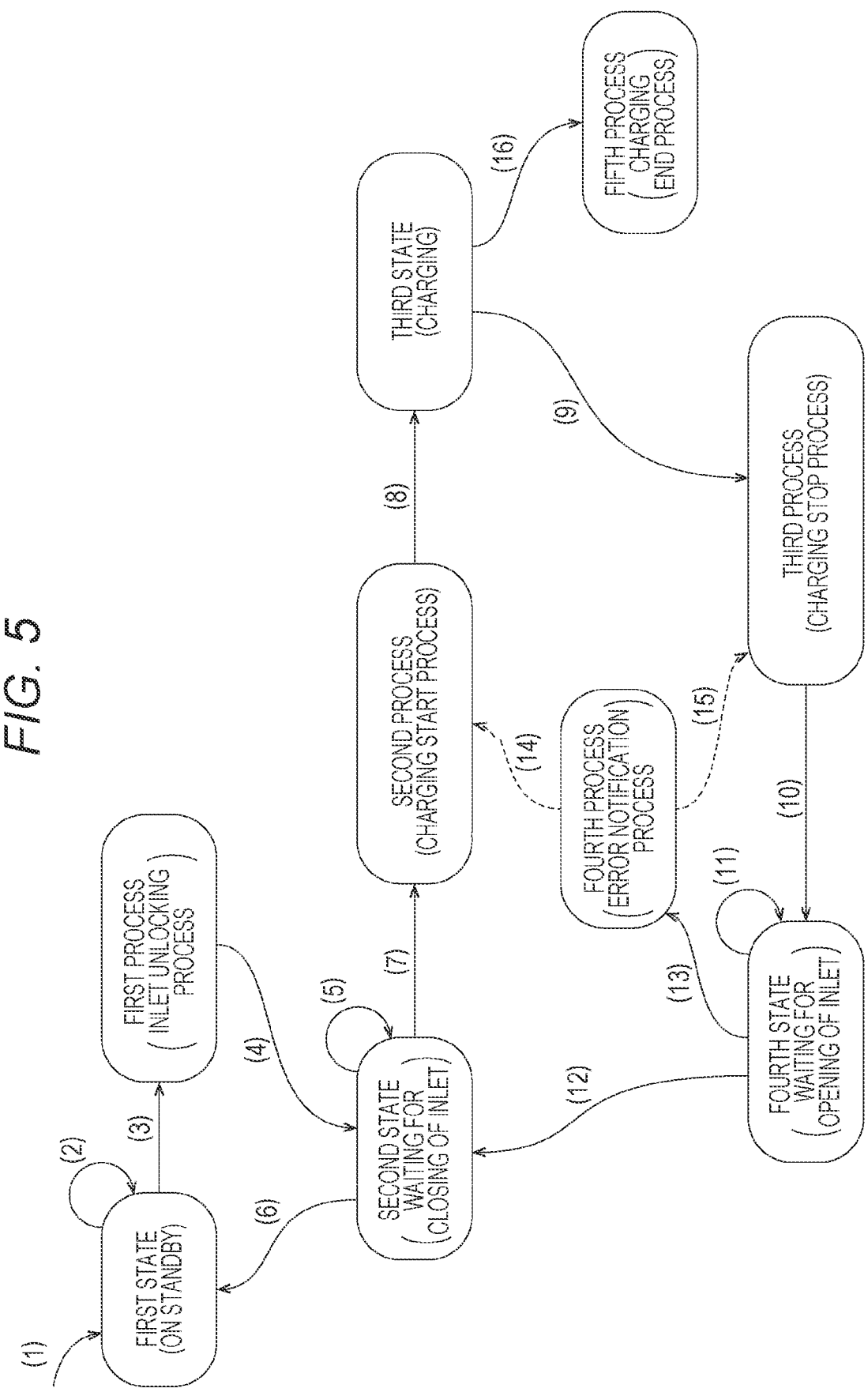
FIG. 5 is a diagram illustrating a state transition diagram of a charging process.

FIG. 5 is a diagram illustrating a state transition diagram of the charging process. As illustrated in FIG. 5, when the charging process is started, the state transitions to a first state of being on standby (1). The first state continues until the inlet opening switch 16 is operated by the user and the inlet opening request signal D4 is input to the BCU 15 (2) in the first state.

When the inlet opening switch 16 is operated by the user and the inlet opening request signal D4 is input to the BCU 15 in the first state, the process proceeds to a first process (3), and the BCU 15 executes the first process (inlet unlocking process). In the first process, the BCU 15 transmits the lid lock signal D2 for instructing to unlock the lid 12 corresponding to the inlet opening switch 16 that has transmitted the inlet opening request signal D4, and transitions to a second state of waiting for the closing of the inlet 11 (4). In the second state, it is possible to open the inlet 11 corresponding to the inlet opening switch 16 that has transmitted the inlet opening request signal D4.

The second state continues until the inlet state detection signal D1 is input from the state detection sensor 17 of the inlet 11 that can be opened in the second state (5). When the inlet state detection signal D1 indicating that the lid 12 is closed is input from the state detection sensor 17 of the openable inlet 11 to the BCU 15, the state transitions to the first state (6).

When the inlet state detection signal D1 indicating that the charging gun 4 is inserted into the inlet 11 is input to the BCU 15, the process proceeds to a second process (7), and the BCU 15 executes the second process (charging start process).

In the second process, the BCU 15 locks the inlet 11. Here, the locking of the inlet 11 includes transmission of the charging gun lock signal D5 for instructing to lock the charging gun 4 in order to prevent the inserted charging gun 4 from coming off, and transmission of the lid lock signal D2 for instructing to lock the lid 12 in order to prevent the lid 12 from being opened.

The BCU 15 transmits the contactor drive signal D3 for turning on the contactor 13 to the contactor 13 to turn on the contactor 13. Then, the BCU 15 transmits the command value signal D6 indicating the current value and the voltage value to the charger 2, and transitions to a third state (8).

When the current value and the voltage value are specified, the charger 2 starts charging the battery 14 by supplying a direct current of the specified current value and voltage value to the vehicle 1.

In the third state, when the inlet opening switch 16 is operated by the user and the inlet opening request signal D4 is input to the BCU 15, the process proceeds to a third process (9), and the BCU 15 executes the third process (charging stop process). Here, in order to switch charging from the two chargers 2 to the one charger 2 or switch charging from the one charger 2 to the two chargers 2, the user operates the inlet opening switch 16, and thereby the process shifts to the third process.

In the third process, the BCU 15 transmits the command value signal D6 for dropping the current value and the voltage value to zero (prescribed value) to the charger 2, and drops the current value and the voltage value of the direct current flowing through the contactor 13 to zero. Thereafter, the BCU 15 transmits the contactor drive signal D3 for turning off the contactor 13 to the contactor 13 to turn off the contactor 13.

The BCU 15 unlocks the inlet 11 corresponding to the inlet opening switch 16 operated by the user, and transitions to a fourth state (10). Here, the unlocking of the inlet 11 includes transmission of the charging gun lock signal D5 for instructing to unlock the charging gun 4 so that the inserted charging gun 4 becomes removable, and transmission of the lid lock signal D2 for instructing to unlock the lid 12 so that the lid 12 can be opened.

The fourth state continues until the inlet 11 is opened in the fourth state (11). When the inlet state detection signal D1 indicating that the inlet 11 is opened is input to the BCU 15 in the fourth state, the state transitions to the second state (12). When a predetermined time elapses after the inlet 11 is opened, the process shifts to a fourth process (error notification process) (13). In the fourth process, the BCU 15 notifies the user that the inlet 11 is not opened. Here, for example, the notification may be displayed on a display provided in the vehicle 1, or a sound may be output from a speaker provided in the vehicle 1.

After performing the fourth process, the BCU 15 may end the charging process, may transition to the second process (14), or may transition to the third process (15).

Further, when a charging end condition is satisfied in the third state, the process proceeds to a fifth process, and the BCU 15 performs the fifth process (charging end process) (16). In the fifth process, the BCU 15 transmits the command value signal D6 for dropping the current value and the voltage value to zero to the charger 2, and causes the current value and the voltage value of the direct current flowing through the contactor 13 to drop to zero. Thereafter, the BCU 15 transmits the contactor drive signal D3 for turning off the contactor 13 to the contactor 13 to turn off the contactor 13.

The BCU 15 transmits, to the charger 2, the charging gun lock signal D5 for instructing to unlock the charging gun 4 in order to allow the charging gun 4 inserted therein to be removed, and notifies the user that the charging is finished and the charging gun 4 can be removed. Then, when the charging gun 4 is removed and the lid 12 is closed, the BCU 15 transmits the lid lock signal D2 for instructing to lock the lid 12 to cause the lid 12 to be locked.

In such a state transition, when charging by one charger 2 is changed to charging by two chargers 2, the charging gun 4 is inserted into one inlet 11 and charging by one charger 2 is started in the third state after being through the first state, the first process, the second state, and the second process. In this state, when the inlet opening switch 16 corresponding to the non-charging inlet 11 is operated and the inlet opening request signal D4 is input to the BCU 15, the process proceeds to the third process (9). In the third process, the BCU 15 turns off the contactor 13 after dropping the current value and the voltage value of the direct current flowing through the contactor 13 to zero, and then unlocks the lid 12 to bring the inlet 11 into an openable state (10).

Then, when the charging gun 4 is inserted into the inlet 11 after the lid 12 is opened and the inlet state detection signal D1 indicating that the charging gun 4 is inserted is input to the BCU 15, the process proceeds to the second process (12) and (7), and the BCU 15 executes the second process (charging start process). Here, after locking the charging gun 4 inserted into the inlet 11, the BCU 15 turns on the contactor 13 and resumes (starts) charging by the two chargers 2.

On the other hand, when the charging by the two chargers 2 is changed to the charging by one charger 2, the charging by the two chargers 2 is performed in the third state. In this state, when the inlet opening switch 16 corresponding to the inlet 11 from which the charging gun 4 is to be removed is operated and the inlet opening request signal D4 is input to the BCU 15, the process proceeds to the third process (9). In the third process, the BCU 15 turns off the contactor 13 after dropping the current value and the voltage value of the direct current flowing through the contactor 13 to zero, and then unlocks the charging gun 4 (10).

Then, when the lid 12 is closed after the charging gun 4 is removed and the inlet state detection signal D1 indicating that the lid 12 is closed is input to the BCU 15, the process proceeds to the second process (12) and (7), the BCU 15 executes the second process (charging start process). Here, the BCU 15 turns on the contactor 13 after locking the closed lid 12, and resumes charging by one charger 2.

Figure 6:
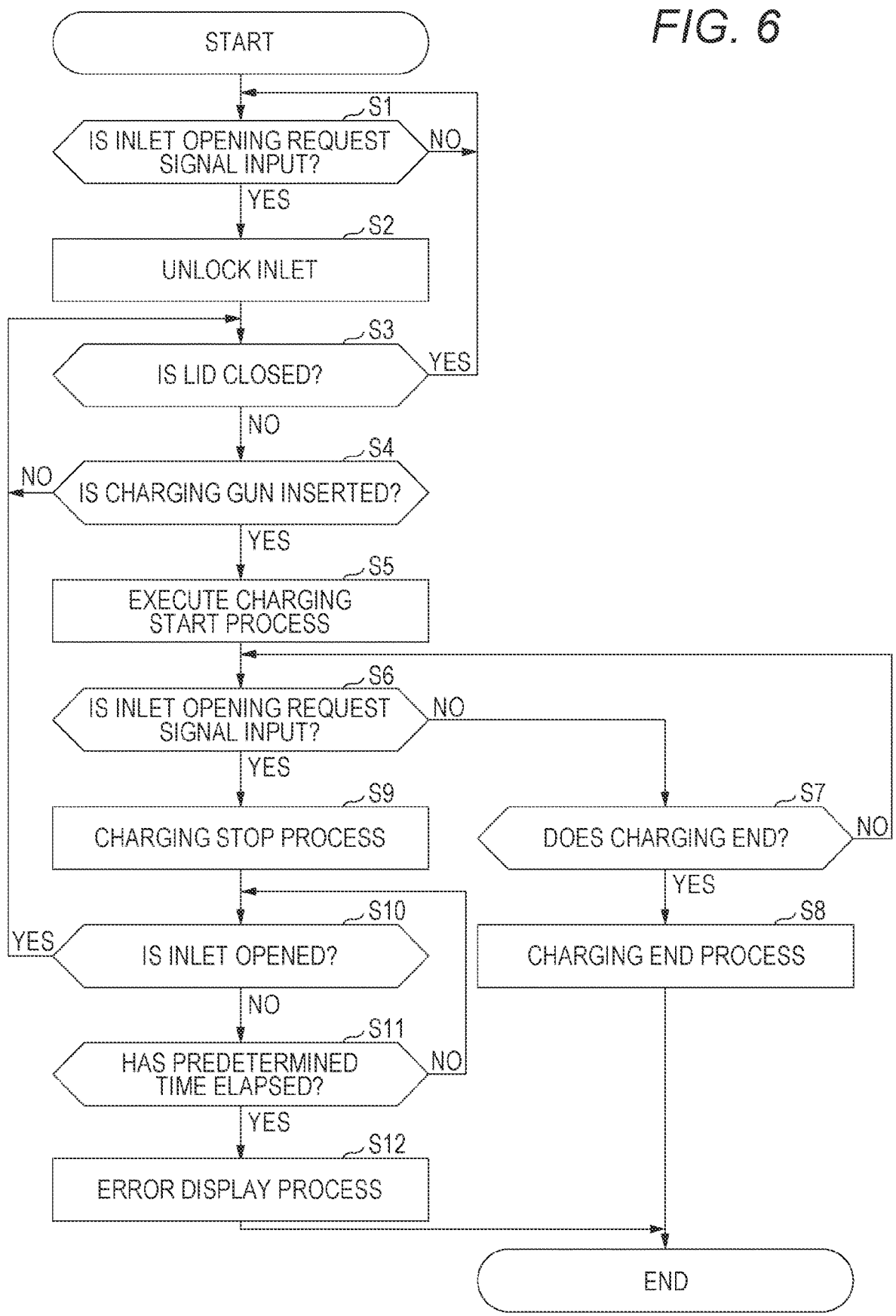
FIG. 6 is a flowchart illustrating a flow of the charging process.

FIG. 6 is a flowchart illustrating a flow of the charging process. As illustrated in FIG. 6, when the charging process is started, the BCU 15 determines whether the inlet opening request signal D4 is input as the inlet opening switch 16 is operated by the user. Then, the BCU 15 repeats step S1 until the inlet opening request signal D4 is input (No in step S1).

Upon receiving the inlet opening request signal D4 (Yes in step S1), in step S2, the BCU 15 transmits the lid lock signal D2 for instructing to unlock the lid 12 that closes the inlet 11 corresponding to the inlet opening switch 16 that has transmitted the inlet opening request signal D4.

Thereafter, in step S3, the BCU 15 determines whether the inlet state detection signal D1 indicating that the lid 12 is closed is input. When the inlet state detection signal D1 indicating that the lid 12 is closed is input (Yes in step S3), the BCU 15 returns the process to step S1.

On the other hand, when the inlet state detection signal D1 indicating that the lid 12 is closed is not input (No in step S3), the BCU 15 determines in step S4 whether the inlet state detection signal D1 indicating that the charging gun 4 is inserted is input. When the inlet state detection signal D1 indicating that the charging gun 4 is inserted is not input (No in step S4), the BCU 15 returns the process to step S3.

When the inlet state detection signal D1 indicating that the charging gun 4 is inserted is input (Yes in step S4), the BCU 15 executes the charging start process in step S5. Here, the BCU 15 locks the charging gun 4 inserted into the inlet 11, and outputs the contactor drive signal D3 for turning on the contactor 13 to the contactor 13 to turn on the contactor 13. Then, the BCU 15 performs data communication for specifying a voltage value and a current value to the charger 2. When the voltage value and the current value are specified, the charger 2 supplies the direct current of the specified voltage value and current value to the vehicle 1.

Thereafter, in step S6, the BCU 15 determines whether the inlet opening request signal D4 is input as the inlet opening switch 16 is operated by the user. When the inlet opening request signal D4 is not input (No in step S6), the BCU 15 determines in step S7 whether the charging end condition is satisfied. The BCU 15 repeats steps S6 and S7 until the inlet opening request signal D4 is input or the charging end condition is satisfied.

When the charging end condition is satisfied (Yes in step S7), the BCU 15 executes the charging end process in step S8. Here, the BCU 15 performs data communication for dropping the voltage value and the current value to zero to the charger 2, and then transmits the contactor drive signal D3 for turning off the contactor 13 to the contactor 13 to turn off the contactor 13. The BCU 15 unlocks the inlet 11 with the charging gun 4 being inserted, and notifies the user that the charging is finished and the charging gun 4 can be removed. When the charging gun 4 is removed and the lid 12 is closed, the BCU 15 locks the lid 12 of the inlet 11.

On the other hand, when the inlet opening request signal D4 is input (Yes in step S6), the BCU 15 performs the charging stop process in step S9. Here, the BCU 15 performs data communication for dropping the voltage value and the current value to zero to the charger 2, and then transmits the contactor drive signal D3 for turning off the contactor 13 to the contactor 13 to turn off the contactor 13. The BCU 15 unlocks the inlet 11 corresponding to the inlet opening switch 16 operated by the user.

Then, in step S10, the BCU 15 determines whether the inlet state detection signal D1 indicating that the inlet 11 is opened is input. When the inlet state detection signal D1 indicating that the inlet 11 is opened is not input (No in step S10), the BCU 15 determines in step S11 whether a predetermined time has elapsed. The BCU 15 repeats steps S10 and S11 until the inlet state detection signal D1 indicating that the inlet 11 is opened is input or a predetermined time elapses.

When the inlet state detection signal D1 indicating that the inlet 11 is opened is input (Yes in step S10), the BCU 15 returns the process to step S3. When the predetermined time has elapsed (Yes in step S11), in step S12, the BCU 15 notifies the user that the inlet 11 is not opened.

Although the embodiment according to the disclosure have been described above, the disclosure is not limited to the above-described specific examples, and various configurations can be employed.

For example, the program for executing the charging process described above can be stored in advance in a recording medium built in a device such as a computer device, a ROM in a microcomputer having a CPU, or the like.

In the embodiment described above, the vehicle 1 includes the two inlets 11. However, it is sufficient if the vehicle 1 include multiple inlets 11, and the vehicle 1 may include three or more inlets 11.

In the embodiment described above, each of the lid lock mechanism 18 and the charging gun lock mechanism 5 is provided. However, as long as the lid lock mechanism 18 and the charging gun lock mechanism 5 can lock and unlock the lid 12 and lock and unlock the charging gun 4, one may also serve as the other and the other may not be provided.

In the above embodiment, the charging gun lock mechanism 5 is provided in the charging gun 4, but the charging gun lock mechanism 5 may be provided in the vehicle 1.

As described above, the vehicle 1 according to the embodiment includes inlets 11 into which charging guns 4 of charging apparatuses (chargers 2) are inserted, one contactor 13 coupled between the inlets 11 and a battery 14, and a controller (BCU 15) configured to perform control to allow the charging apparatuses (chargers 2) to simultaneously charge the battery 14.

Thus, the vehicle 1 can be charged by switching the chargers 2 to be coupled according to the number of usable chargers 2. At this time, the vehicle 1 can allow inserting or removing the charging gun 4 by temporarily turning off the contactor 13 without ending the charging process. That is, when the number of chargers 2 is changed, the vehicle 1 does not involve causing the user to input charging settings and the like again.

Therefore, the vehicle 1 can achieve efficient charging of the battery 14 to shorten the charging time while improving the convenience of the user.

The vehicle further includes lids 12 configured to cover the inlets 11 in one-to-one correspondence and a lid lock mechanism 18 configured to lock opening and closing of each of the lids 12, in which when a number of the charging apparatuses (chargers 2) to be coupled is increased, upon issuance of a request to open the inlet 11 that is vacant from among the inlets 11, the controller (BCU 15) turns off the contactor 13 and then causes the lid lock mechanism 18 to unlock the lid 12, and turns on the contactor 13 and restarts charging after the charging gun 4 is inserted into the inlet 11 and the charging gun 4 is locked.

Thus, when the charging gun 4 is inserted into the inlet 11, the exposed inlet 11 is not in a high voltage state, so that electric leakage, electric shock, and the like can be prevented.

The vehicle further includes lids 12 configured to cover the inlets 11 in one-to-one correspondence and a lid lock mechanism 18 configured to lock opening and closing of each of the lids 12, in which when a number of the charging apparatuses (chargers 2) that are coupled is reduced, upon issuance of a request to open the inlet 11 with the charging gun 4 being inserted from among the inlets 11, the controller (BCU 15) turns off the contactor 13 and then unlocks the charging gun 4, and resumes the charging after the charging gun 4 is removed from the inlet 11, the lid 12 is closed, and the lid 12 is locked by the lid lock mechanism 18.

Thus, when the charging gun 4 is removed, the exposed inlet 11 is not in a high voltage state, so that electric leakage, electric shock, and the like can be prevented.

The controller (BCU 15) turns off the contactor 13 after the current value during charging decreases to a prescribed value.

Thus, it is possible to prevent the contactor 13 from being turned off in a high voltage and high current state and to turn off the contactor 13 more safely.

The controller (BCU 15) performs an error notification when the inlet 11 is not opened even after a predetermined time elapses since the lid 12 or the charging gun 4 is unlocked after issuance of the request to open the inlet 11.

Thus, it is possible to prevent a long time from elapsing in a state where the lid 12 or the charging gun 4 is unlocked.

The invention claimed is:

1. A vehicle comprising:
   inlets into which charging guns of charging apparatuses are to be inserted respectively;
   one contactor coupled between the inlets and a battery;
   a controller configured to perform control to allow the charging apparatuses to simultaneously charge the battery through the one contactor;
   lids configured to cover the inlets respectively; and
   lid lock mechanisms configured to lock opening and closing of the lids, wherein
   the controller is, when a number of one or more charging apparatuses that are coupled among the charging apparatuses is increased, configured to:
   upon issuance of a request to open one or more inlets being vacant among the inlets, turn off the contactor and then cause one or more lid lock mechanisms corresponding to the one or more inlets among the lid lock mechanisms to unlock one or more lids corresponding to the one or more inlets among the lids; and
   turn on the contactor and resume charging the battery after one or more of the charging guns are inserted into the one or more inlets and locked.

2. The vehicle according to claim 1, wherein
   the controller is configured to turn off the contactor after a value of current during charging the battery decreases to a prescribed value.

3. The vehicle according to claim 1, wherein
   the controller is configured to perform an error notification when the one or more inlets is not opened even after a predetermined time elapses since the one or more lids or the one or more of the charging guns is unlocked after the issuance of the request to open the one or more inlets.

4. A vehicle comprising:
   inlets into which charging guns of charging apparatuses are to be inserted respectively:
   one contactor coupled between the inlets and a battery;
   a controller configured to perform control to allow the charging apparatuses to simultaneously charge the battery through the one contactor;
   lids configured to cover the inlets respectively; and
   lid lock mechanisms configured to lock opening and closing of the lids, wherein
   the controller is, when a number of one or more charging apparatuses that are coupled among the charging apparatuses is reduced, configured to:
   upon issuance of a request to open one or more inlets into which one or more of the charging guns are inserted among the inlets, turn off the contactor and then unlock the one or more of the charging guns; and
   resume charging the battery after the one or more of the charging guns are removed from the one or more inlets, one or more of the lids corresponding to the one or more inlets are closed, and corresponding one or more of the lid lock mechanisms lock the one or more of the lids.

5. The vehicle according to claim 4, wherein
   the controller is configured to turn off the contactor after a value of current during charging the battery decreases to a prescribed value.

6. The vehicle according to claim 4, wherein
   the controller is configured to perform an error notification when the one or more inlets is not opened even after a predetermined time elapses since the one or more lids or the one or more of the charging guns is unlocked after the issuance of the request to open the one or more inlets.

* * * * *